United States Patent [19]
Lee

[11] Patent Number: 6,066,393
[45] Date of Patent: May 23, 2000

[54] POLYOLEFIN/IONOMER BLEND FOR IMPROVED PROPERTIES IN EXTRUDED FOAM PRODUCTS

[75] Inventor: Shau-Tarng Lee, Oakland, N.J.

[73] Assignee: Sealed Air Corporation, Saddle Brook, N.J.

[21] Appl. No.: 09/187,997

[22] Filed: Nov. 6, 1998

[51] Int. Cl.[7] ...................................................... B32B 27/00
[52] U.S. Cl. ...................................... 428/319.9; 428/304.4; 428/316.6; 428/319.3; 428/319.7
[58] Field of Search ............................. 428/316.6, 319.3, 428/319.7, 319.9

[56] References Cited

U.S. PATENT DOCUMENTS

| | | |
|---|---|---|
| 3,669,786 | 6/1972 | Moore . |
| 4,091,136 | 5/1978 | O'Brien et al. . |
| 4,102,829 | 7/1978 | Watanabe et al. . |
| 4,137,348 | 1/1979 | Gilman ........................................ 428/33 |
| 4,307,204 | 12/1981 | Vidal . |
| 4,331,779 | 5/1982 | Park . |
| 4,347,329 | 8/1982 | Park . |
| 4,640,933 | 2/1987 | Park . |
| 4,663,361 | 5/1987 | Park . |
| 4,694,027 | 9/1987 | Park . |
| 4,738,810 | 4/1988 | Cheng-Shiang . |
| 5,059,376 | 10/1991 | Pontiff et al. .......................... 264/234 |
| 5,225,451 | 7/1993 | Rogers et al. . |
| 5,373,027 | 12/1994 | Hanley et al. . |
| 5,462,974 | 10/1995 | Lee . |
| 5,611,962 | 3/1997 | Garcia et al. . |
| 5,844,009 | 12/1998 | Hurley et al. ........................... 521/112 |
| 5,874,024 | 2/1999 | Knaus ..................................... 252/356 |
| 5,895,614 | 4/1999 | Rivera et al. . |
| 5,916,926 | 6/1999 | Cooper et al. ............................ 521/53 |

*Primary Examiner*—Helen L. Pezzuto
*Attorney, Agent, or Firm*—Alston & Bird LLP

[57] ABSTRACT

Ionomer present in a polyethylene resin from about 1 to 40% by weight of the resin produces superior extruded foam sheet products that approach the pore size and resiliency of foams prepared from chemical blowing agents. The results can be achieved at normal extrusion rates and on standard extrusion foaming equipment.

16 Claims, 5 Drawing Sheets

POLYOLEFIN/IONOMER BLEND FOR IMPROVED PROPERTIES IN EXTRUDED FOAM PRODUCTS

FIELD OF THE INVENTION

This invention relates to expanded cellular polyolefin products.

BACKGROUND OF THE INVENTION

One common method of preparing expanded cellular products is to mix a molten polymeric resin with a physical blowing agent in a zone of high pressure and to extrude the mixture into a zone of lower pressure where the blowing agent expands. Foams of low density and having a wide range of uses can be economically produced at high extrusion rates using physical blowing agents.

However, foams produced with physical blowing agents generally do not have the fine cell structure, resiliency, and softness that can be achieved with chemical blowing agents, which tends to limit the market for extruded foams. High quality shoe soles, padded surfaces for exercise equipment, and protective padding can be made from foams prepared with chemical blowing agents.

Foams that are prepared with chemical blowing agents normally are prepared in a two-stage process that is more troublesome and expensive than extrusion foaming. Chemical blowing agents generally are not activated until after the extrusion so that the extruded resin can be cross linked. Chemical blowing agents release a high rate of gas, normally an inert gas, including nitrogen or carbon dioxide. In the absence of cross linking, a chemical blowing agent generally would produce a large number of open, coarse cells.

Foams can be cross linked by irradiation or by free-radical catalysts, including peroxides. In one method, a molten polymer resin is mixed with peroxide and a chemical blowing agent. The temperature is kept as low as possible to avoid premature cross linking. Premature cross linking makes the resin more difficult to extrude and increases the amount of heat generated. Extreme heat tends to produce foams that are unstable and are subject to collapse. The resin is extruded and the extrudate is heated to initiate cross linking and to activate the chemical blowing agent to produce a foam.

Cheng-Shiang U.S. Pat. No. 4,738,810 describes a method of preparing a foam with a chemical blowing agent. The foam is prepared from linear low density polyethylene. Excessive cross linking is said to be precluded by premixing a chemical bowing agent, a cross linking agent, and other polymeric components before mixing with the linear low density resin.

Ionomer is said to be useful as one of the other polymeric components. Ionomers are copolymers having an ionizable comonomer. Ionomers are normally prepared by copolymerization of ethylene with small amounts of an unsaturated carboxylic acid, followed by ionization of the acid group to yield a metal salt. The ionized groups act as meltable cross links.

Ionomers have been used to improve the toughness and opacity to films, including the multilayer films that are used in vacuum skin packaging. Ionomers have also been used in resins for extrusion foaming under certain circumstances.

For example, Watanabe et al. U.S. Pat. No. 4,102,829 discloses low density extruded foams prepared from a mixture of from about 5 to 65% polyolefin and from about 35 to 95% ionomer. The foams are said to have a good balance of properties, including thermal resistance, and are indicated to be useful as an insulation covering on pipes for an air conditioner.

O'Brien et al. U.S. Pat. No. 4,091,136 discloses a synthetic cork-like material for use as a closure for liquid containers that is composed of an extruded fine-celled polyolefin foam containing an ionomer. The O'Brien et al. patent describes preparing a polyethylene foam rod with from 0.5 to 35 weight percent of DuPont Surlyn ionomer in the foamable resin mixture. The presence of ionomer is said to provide sufficient structural strength to the polyolefin foam so that it can be handled in conventional corking equipment.

Cylindrical product profiles that characterize insulation covers for air conditioning pipes and synthetic cork generally result in relatively low shear in the extrusion process, on the order of 10 $sec^{-1}$. Shear generates heat, which reduces melt strength and can be problematic, particularly at higher levels, resulting in unstable foams that tend to collapse.

Extrusion foaming of sheet product profiles generally results in higher shear in the extrusion process of about 100 $sec^{-1}$ or more. Shear can be several orders of magnitude greater for the production of sheet than for cylindrical product profiles.

High shear generation means that the heat generated by extrusion can be problematic. The "processing window" of suitable operating parameters of shear, melt temperature, and extrusion throughput for producing foam sheet products is relatively narrow compared to cylindrical product profiles. The process of extrusion foaming of sheet products normally will not tolerate cross linking in the resin, particularly at higher shear rates. Cross linking can render a resin unprocessable, particularly at high shear. Accordingly, there is not believed to have been any disclosure or suggestion to incorporate ionomer into polyolefin resins for extrusion as sheet or plank.

It would be desirable if polyolefin foam sheet products could be prepared with the economies of the extrusion foaming process that could be competitive with foams prepared from chemical blowing agents. However, polyolefins are relatively low modulus polymers that normally do not have the melt strength to form extruded foams of the fine cell structure and resiliency that is achieved with cross linking and expansion with chemical blowing agents.

SUMMARY OF THE INVENTION

The invention relates to the use of ionomers in polyolefin resins for the production of polyolefin foam sheet having improved properties. It should be understood that, as used herein, the term sheet designates thin polyolefin extruded foams of less than about ½-inch in thickness and also includes the thicker plank product profiles of up to about 3 inches or so.

It has been determined that polyolefin foam sheet can be produced by a single stage extrusion foaming process having an acceptable processing window when ionomer is incorporated into the resin at particular levels. The foam can be made recyclable, which generally is not true of foams prepared from chemical blowing agents. Foam sheet products having improved properties, including thermoformability, cushioning, creep resistance, compression strength, hysteresis, and a softer touch, can be achieved at the high extrusion foaming throughputs that are desired commercially. High throughput can be achieved on existing single-stage extrusion equipment without having to make special or difficult process adjustments.

At typical shear conditions for sheet products, the ionomer should be present in the polyolefin resin in an amount of from about 1 to 25% by weight, based on the polyolefin and ionomer components, for most applications. The extruded foam sheet product will have a similar amount of ionomer. Above about 25%, the processing window becomes narrow and it is more difficult to produce an acceptable product. However, at relatively lower shear, it should be possible to use up to about 40% by weight ionomer in the resin. The temperature of the melt at the exit of the extruder should be maintained at less than or equal to about 238 degrees Fahrenheit, and usually at about 230 degrees.

The density of the foam can range from about 20 to 150 kilograms per cubic meter. For thermoforming applications, including disposable trays for medical and dental instruments and the like, the density is normally from about 20 to 50 kilograms per cubic meter. The foam can be prepared with fine cells of from about 15 to 60 cells per square inch. The foam can generally successfully resist an impact of from 200 to 425 pounds per square inch. The foam can be produced as thin sheets of about one-half inch or less in thickness. Thicker plank foam products can be produced by extruding the foam in sheets of one-half inch or greater thickness, up to about 2 inches, and by laminating two or more thin sheets to a desired thickness of up to about 3 inches.

The resin mixture from which the foams are made can optionally include a metallocene polyolefin, which normally is a metallocene polyethylene, and which further strengthens the resin for expansion with a blowing agent. The metallocene generally is present in an amount of from about 5 to 30% by weight of the resin.

Thus, the invention provides, among other benefits, an expanded cellular polyethylene sheet product of low density having improved characteristics that are competitive with foams prepared from chemical blowing agents. The expanded product has improved thermoformability and packaging characteristics without burdensome adjustments in processing conditions. The resin from which the product is made has processability suitable for single stage expansion.

BRIEF DESCRIPTION OF THE DRAWINGS

Examples of foams prepared in accordance with the invention will now be described with reference to the accompanying drawings and the several tables that appear below in the Detailed Description of the Invention, in which drawings.

DETAILED DESCRIPTION OF THE INVENTION

Various processes and equipment for extrusion foaming of thermoplastic resins have been used for many years. Generally, solid pellets of thermoplastic resin are fed through a hopper to a melting zone in which the resin is melted, or plasticized, to form a flowable thermoplastic mass. The plasticized thermoplastic mass generally is then metered to a mixing zone where the thermoplastic mass is thoroughly mixed with a blowing agent under pressure for subsequent cooling and expansion of the resin to form a foam. Blowing agent typically is injected between the metering and the mixing zones. The blowing agent can be injected through a single port or multiple ports. Multiple ports can be used for different blowing agent components or the components can enter through a single port. The mixture of thermoplastic resin and blowing agent is then forced through a die, which imparts a shape to the thermoplastic mass, into a zone of lower pressure, such as atmospheric pressure. The blowing agent expands to form the cells of the foam and the thermoplastic foam is cooled.

Typical of much of the equipment used for extrusion of thermoplastic foams, the thermoplastic pellets are conveyed from a hopper through the melt zone and the mixing and cooling zones, and is then extruded through the die by a screw type apparatus. Single screw extruders are common, although double screw extruders sometimes are used for greater mixing. Double screw extruders can be either twin screw, in which the resin passes through two screws in parallel, or tandem screws, in which the resin passes through two screws in series.

When a blowing agent is injected into the mixing zone of the screw extruder, the blowing agent initially forms a dispersion of insoluble bubbles within the plasticized thermoplastic mass. These bubbles eventually dissolve in the thermoplastic mass as the mixing continues and the pressure increases down the length of the extruder. The extruder should have a length to diameter ratio of at least 30:1 and a sufficient length of mixing zone to ensure that proper mixing occurs.

Thermoplastic resins contemplated for use in the practice of the invention claimed herein include the polyolefin resins. Polyolefin resins may be defined as polymers derived from unsaturated hydrocarbons containing the ethylene or diene functional groups. Polyolefin resins may include virtually all of the addition polymers, however, the term polyolefin typically is used for polymers of ethylene, the alkyl derivatives of ethylene (the alpha-olefins), and the dienes. Among the more commercially important polyolefins are polyethylene, polypropylene, polybutene, and their copolymers. Polyethylene resins are particularly useful in the practice of the invention claimed herein.

Polyethylene is a whitish, translucent polymer of moderate strength and high toughness. Polyethylene is available in forms ranging in crystallinity from 35 to 95 percent. Polyethylene is available in low, medium, and high density polymer forms. For the low density material, the softening temperature is about 105° C. to 115° C. For the high density material the softening temperature is some 25° C. to 40° C. higher, or from about 130° C. to 140° C. Low, medium, and high density polyethylenes are suitable for extrusion foaming, including mixtures thereof.

The thermoplastic resin should be maintained at a temperature within a range above the melting point of the polymer that is sufficiently high so that the polymer has sufficient fluidity for mixing with blowing agent. This range normally will be from about 20° C. to 100° C. above the melting point of the resin. The melting zone can be maintained at a somewhat lower temperature due to the heat that is generated by friction as the plasticized resin flows through the extruder.

After mixing, the temperature of the mixture of resin and blowing agent should be lowered closer to the melting point of the mixture so that the polymer maintains its structure upon foaming, but not so much that complete expansion is hindered. The blowing agent has a plasticizing effect on the resin reducing its viscosity, or resistance to flow, and so the melting point of the mixture of resin and blowing agent normally is below that of the resin alone. The expansion temperature, which is above the melting point of the mixture, is empirically determined and depends upon the composition of the resin, the length of the screw, whether single or double screws are used, on the specific resin, upon the amount of blowing agent, and the specific blowing agent blend. For a low density polyethylene, the expansion temperature will generally be in the range of from about 85° C. to 120° C.

The blowing agent contemplated for use in practicing the invention should preferably comprise those that are acceptable in commercial practice. Various volatile organic compounds ("VOCs") are useful blowing agents, including the light aliphatic hydrocarbons ethane, propane, butane, and others, used alone or in mixtures, including mixtures with halogenated hydrocarbons and/or various inert gases, including nitrogen and carbon dioxide. Halogenated hydrocarbons, including clorofluorinated hydrocarbons ("CFCs"), and mixtures of halogenated hydrocarbons can be used in connection with practice of the invention. However, governmental regulation is phasing out use of many halogenated hydrocarbons because these compounds may be responsible for damage to the earth's ozone layer.

An ionomer should be mixed with the polyolefin resin to form a homogeneous resin prior to mixing with blowing agent and expansion. Ionomers are copolymers of ethylene and a vinyl monomer with an acid group such as methyacrylic acid. The ionomers are cross-linked polymers in which the linkages are ionic and covalent bonds. There are positively and negatively charged groups that are not associated with each other, and this polar character makes these resins unique. One example of an ionomer that is useful in the practice of the invention is sold under the mark Surlyn, which is available from DuPont. Several Surlyn formulations are available.

The benefits of the invention can be achieved with the use of relatively small amounts of ionomer in the polyolefin resin. The ionomer should typically be present in admixture with the polyolefin in an amount of from about 1 to 25 percent by weight of the admixture. Generally speaking, benefits of the invention can be achieved with from about 1 to 10 percent ionomer by weight of the resin. Up to about 40 percent ionomer can be used if the shear that is developed at the exit of the extruder, where the greatest shear is developed, is not too great.

Shear tends to promote heat and the formation of open cells. Cross linking leads to shear development, and so it is desirable that no cross linking occur prior to extrusion. Shear rate for producing polyolefin foam sheet can be as low as about 80 to 100 sec$^{-1}$ and normally are less than 1,000 sec$^{-1}$. However, shear rates of from about 1,000 to 2,000 sec$^{-1}$ are somewhat more common.

While not wishing to be bound by theory, it is believed that the ionomer, at the relatively low temperatures at which polyolefin resins are extrusion foamed, forms physical, ionic bonds in the resin. Ionic bonds are to be distinguished from the covalent, chemical bonds formed by a typical cross linking agent. The ionic cross links continue to form as the foam cools after extrusion, further strengthening the foam. The ionic bonds are thermally reversible, which renders the foam recyclable.

Polyolefins are generally of low modulus, which is to say that the polymers have relatively low stiffness, tensile strength, and compression resistance. Ionomer cross linking of the extruded resin improves the characteristics of the foams, including stiffness, tensile strength, and compression resistance.

Metallocene polyethylenes are also useful in admixture with the resin of the invention and can further improve the strength of the resin for extrusion foaming. Metallocenes are organometallic coordination compounds obtained as a cyclopentadienyl derivative of a transition metal or metal halide. When present, the metallocene polyethylene should be present in an amount of from about 5 to 30 percent by weight of the resin, based on the polyethylene, ionomer, and metallocene polyethylene in the resin.

Table 1, below, compares the thermoformability of foams prepared in accordance with the invention with that of a standard low density polyethylene foam. The foams have similar cell count. Thermoformability is visually observed. The presence of a small amount of ionomer, 5% by weight of the resin, and a metallocene linear low density polyethylene at about 24% by weight in a low density polyethylene resin produced a foam having very good thermoformability properties as compared to a standard polyethylene foam in the absence of ionomer and metallocene polyethylene. Metallocene linear low density polyethylene increases the melt strength of the resin. However, it should be noted that 1 to 2% by weight ionomer should be sufficient in many resins in the absence of metallocene to produce foams having improved characteristics.

TABLE 1

| | LDPE Kg/hr | mLLDPE Metallocene Kg/hr | Ionomer Kg/hr | Cell Counts #/cm | Thermoform |
|---|---|---|---|---|---|
| 1 | 136.4 | 0 | 0 | 19 | N/A |
| 2 | 102.3 | 32.1 | 0 | 20 | Good |
| 3 | 95.5 | 32.1 | 6.8 | 19 | Very Good |

Extruded foams for thermoformed products should have several characteristics. Thin sheets for thermoformed trays should be fine celled and of low density, usually from about 20 to 50 kg/m$^3$. The foam should have a pleasing hand that is not unpleasant to touch.

One important characteristic of foams suitable for thermoforming is thermal stability, which is the ability to withstand the elevated temperatures of the thermoforming process over an extended period of time. Thermal stability is not the same as resistance to thermal deformation, which is also referred to as thermal resistance. Thermal resistance generally refers to the ability of a foam to withstand deformation at a particular elevated temperature. Thermal resistance is usually associated with foams that are used in insulating capacities or are otherwise subjected to elevated temperatures in use.

Table 2, below, compares the compression strength of a standard low density polyethylene foam with that of a foam containing 10 percent by weight ionomer. These 2-in. (5.1 cm) sheets are soft, resilient box foams useful for packaging applications. It can be seen that at each of the various compression levels, the compression strength of the foam containing ionomer is improved as compared to a foam without the ionomer. The effect is more pronounced at higher compression levels, and the ionomer foam generally shows good cushioning performance at higher loads.

TABLE 2

| Material | Compression Strength (psi) | | |
|---|---|---|---|
| | 25% | 50% | 80% |
| Standard Foam | 5.28 | 13.33 | 51.52 |
| Foam with 10% Ionomer | 5.54 | 14.05 | 54.09 |

As shown in Table 3, below, the properties of peak stress, hysteresis, and the difference between loading and unloading energy (resiliency) are all improved with the addition of 10 percent ionomer to polyethylene foam. The lower difference between loading and unloading energy for the ionomer foam indicates that the ionomer foam recovers more fully after compression. In general, the ionomer foams show less cell wall damage, less hysteresis, and better resiliency.

TABLE 3

| | Peak Stress | Loading Energy (in × lbs) | Unloading Energy (in × lbs) | Hysteresis (%) |
|---|---|---|---|---|
| Standard Foam | 42.52 psi | 317.06 | 245.20 | 22.66 |
| Foam with 10% Ionomer | 48.68 psi | 380.23 | 320.92 | 15.60 |

Table 4, below, compares the properties of a standard polyethylene foam sheet, Example 1, to the properties of a foam sheet of 1.3 cm thickness that was made on a 16.8 cm counter-rotating twin screw at 380 Kg/hr (Example 2). Example 1 includes talc as a nucleating control agent. Example 2 was prepared with Hydrocerol CF20, which is a brand of nucleating control agent available from B.I. Chemical. The two different nucleating control agents are not believed to be responsible for the differences between the two foams as shown in the table. Resistance to compression was determined at 25% and at 50% compression, and at each compression, the ionomer foam showed greater resistance to compression. Hysteresis was determined as the inverse energy ratio of loading to 80% compression followed by decompression to the original volume. It should be noted that hysteresis was reduced by the addition of ionomer to the polyethylene foam and that the ionomer foam showed less impact damage.

TABLE 4

| | 1 | 2 |
|---|---|---|
| Ionomer | 0 | 10.5% |
| Density, Kg/m³ | 28.3 | 25.6 |
| Cell Counts, #/inch | 19 | 26 |
| Compression, psi | | |
| 25% | 5.3 | 5.5 |
| 50% | 13.3 | 14.1 |
| Hysteresis % | 22.7 | 15.6 |
| Drop impact difference between 1st and 5th drop, G' | | |

TABLE 4-continued

| | 1 | 2 |
|---|---|---|
| Load | | |
| 0.25 psi | 4 | 2 |
| 0.5 psi | 4 | 3 |
| 1.0 psi | 6 | 3 |
| 1.5 psi | 8 | 4 |
| 2.5 psi | 22 | 14 |

It can be seen in Table 4 that the example of foam having ionomer therein showed less impact damage, as indicated by the difference between the first and last impact drops, than examples without ionomer. G' is defined as an absorption factor and is an indication of the ability of a foam to absorb an impact. The lower the value of G', the more energy is absorbed by the foam. The drop impact test is performed by is defined as an absorption factor and is an indication of the ability of a foam to absorb an impact. The lower the value of G', the more energy is absorbed by the foam. The drop impact test is performed by dropping a weight (static load) on the foam sample from a fixed height of 24 inches. Each weight is dropped five times, and the amount of impact energy absorbed by the foam from each drop is determined. The difference in impact energy absorbed between the first and fifth drops for a particular weight is reported below in Table 5 for each of five different weights. The foam with 10.5% by weight ionomer performed better than foam in the absence of ionomer. There is less difference between the first and fifth drops under the same weight for the ionomer foam, which indicates less damage to the foam after repeated drops.

Table 5, below compares the ability to withstand impact and other properties of four foams of 5.1 cm thickness in a manner similar to Table 4.

TABLE 5

| | 1 | 2 | 3 | 4 |
|---|---|---|---|---|
| talc, Kg/hr | — | 0 | 0 | 0 |
| Nucleator, Kg/hr | 0 | 4 | 4 | 1.2 |
| Ionomer | 0 | 0 | 10% | 10% |
| Density Kg/m³ | 19.4 | 25 | 25.1 | 21.8 |
| Cell Count #/inch | 16 | 25 | 24 | 17 |
| 1st and 5th drop impact difference | | | | |
| Load | | | | |
| 0.25 psi | 5.8 | 10 | 3.3 | 0.4 |
| 0.5 psi | 3.7 | 3.6 | 0.8 | 3.6 |
| 1.0 psi | 4.6 | 2.8 | 3.1 | 3.5 |
| 1.5 psi | 5.3 | 7.4 | 4.0 | 5.1 |
| 2.5 psi | 25.8 | 16.7 | 12.8 | 16.2 |

Table 6, below, compares 2-inch samples (5.1 cm) of foam, one prepared with ionomer and one without, at 5 different static loads (in units of psi). Foam having 10% ionomer showed better impact energy absorbtion at higher static loads than did the standard foam, which is an indication of superior cushioning properties.

TABLE 6

| | | Density | Loading (PSI) | | | | |
| --- | --- | --- | --- | --- | --- | --- | --- |
| | | | 0.25 | 0.50 | 1.00 | 1.50 | 2.50 |
| Standard Foam | 2" | 27.2 kg/m³ | 53 | 51 | 61 | 68 | 123 |
| Foam with 10% Ionomer | 2" | 26.4 kg/m³ | 53 | 50 | 55 | 64 | 113 |

Figure 1:
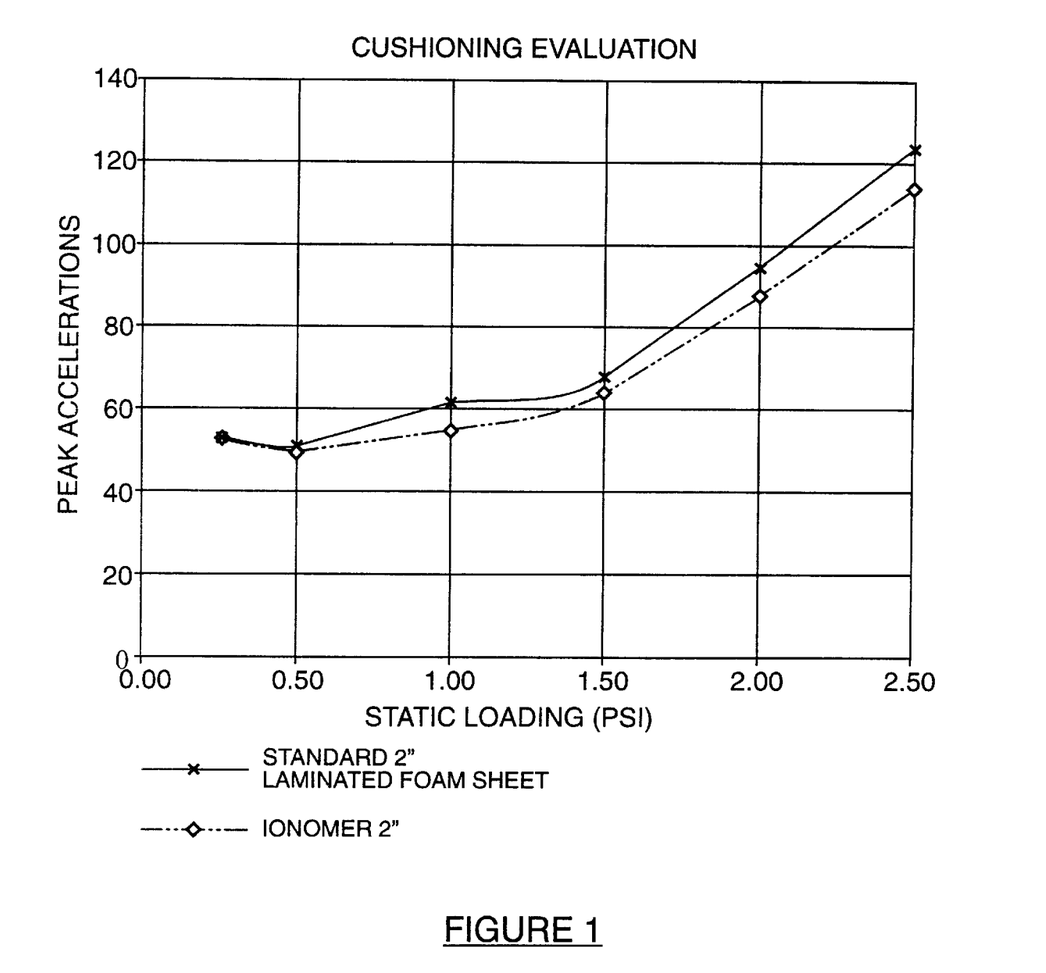
FIG. 1 is a evaluation of the cushioning ability, as a plot of peak acceleration for a particular static loading, of a 2-inch thick laminated polyethylene plank of the invention compared to a standard laminated 2-inch thick polyethylene foam product.

FIG. 1 is a plot of peak accelerations (G') against static loading in lbs/in² (psi) for 2-inch thick laminated polyethylene plank of the invention compared to a standard laminated 2-inch thick polyethylene foam product. The plot shows clearly that the foam prepared with ionomer has better impact resistance across a range of static loads, which is an indication of improved cushioning performance for the ionomer containing foam.

Figure 2:
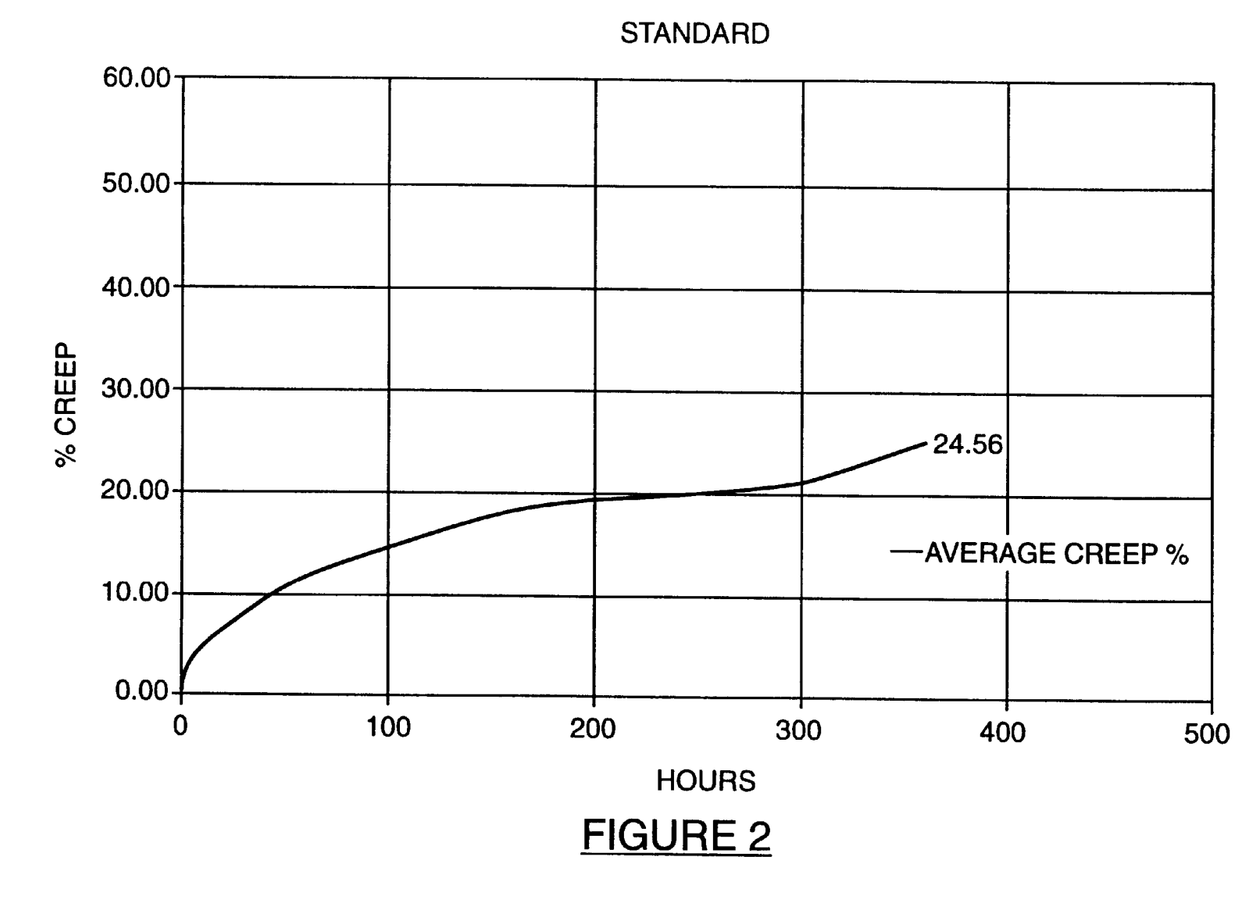
FIG. 2 is an evaluation of creep resistance, as a plot of the percentage of creep against time in hours, for a standard foam prepared in the absence of ionomer.
Figure 3:
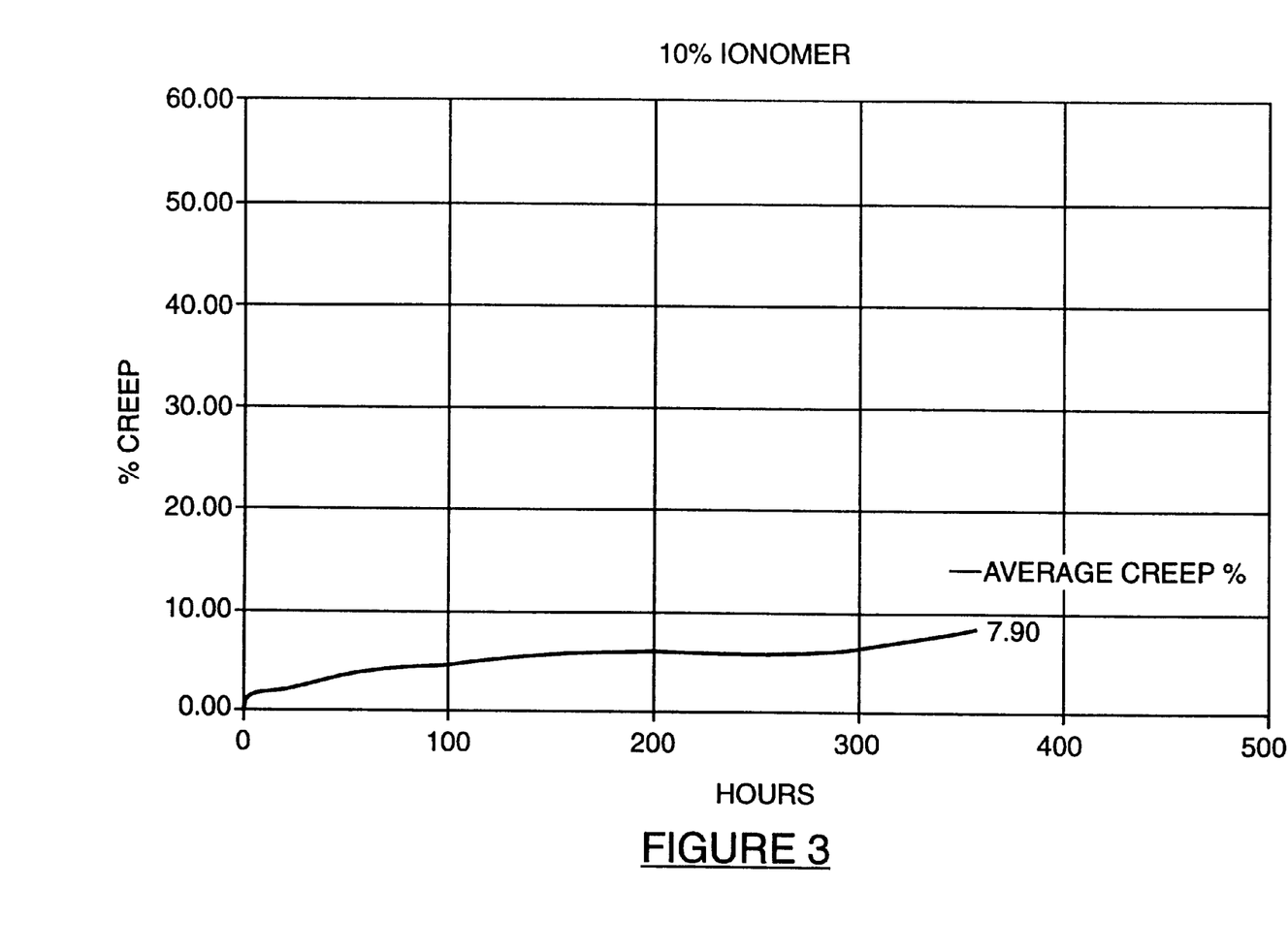
FIG. 3 is an evaluation of creep resistance, as a plot of the percentage of creep against time in hours, for a foam prepared in accordance with the invention, and illustrates the marked improvement in creep resistance due to the presence of ionomer in the resin from which the foam is prepared.

FIG. 2 is an evaluation of creep resistance. The percentage of creep is plotted against time and hours for a standard foam prepared in the absence of ionomer. The same curve plotted for a polyethylene foam containing 10% ionomer is shown in FIG. 3. A comparison of these curves shows that the percentage creep is markedly reduced for the polyethylene foam containing ionomer.

Table 7, below, shows several examples of foams containing varying amounts of ionomer, from 0 to 36.4% by weight. The ionomer containing foams show improvement over that without with respect to impact resistance at constant force and machine and cross direction tensile and elongation.

TABLE 7

| | 1 | 2 | 3 | 4 | 5 | 6 | 7 |
| --- | --- | --- | --- | --- | --- | --- | --- |
| Nucleator | 4.5 | 4.5 | 7.7 | 7.7 | 7.7 | 4.5 | 4.5 |
| Ionomer | 0 | 36.4 | 36.4 | 18.2 | 18.2 | <8 | 0 |
| Density, Kg/m³ | 55 | 91.5 | 88.3 | 87.2 | 84.2 | 87 | 82.9 |
| Cell Counts, #/inch | — | — | — | — | 45 | 50 | 55 |
| Impact, psi | 113 | 412 | 313 | 247 | 202 | 217 | 177 |
| Tensile, psi | | | | | | | |
| MD | 76 | 217 | 181 | 147 | 109 | 146 | 125 |
| CD | 56 | 106 | 98 | 94 | 96 | 99 | 85 |
| Elongation, % | | | | | | | |
| MD | 121 | 125 | 125 | 106 | 120 | 116 | 137 |
| CD | 75 | 107 | 101 | 95 | 93 | 89 | 85 |

Figure 4:
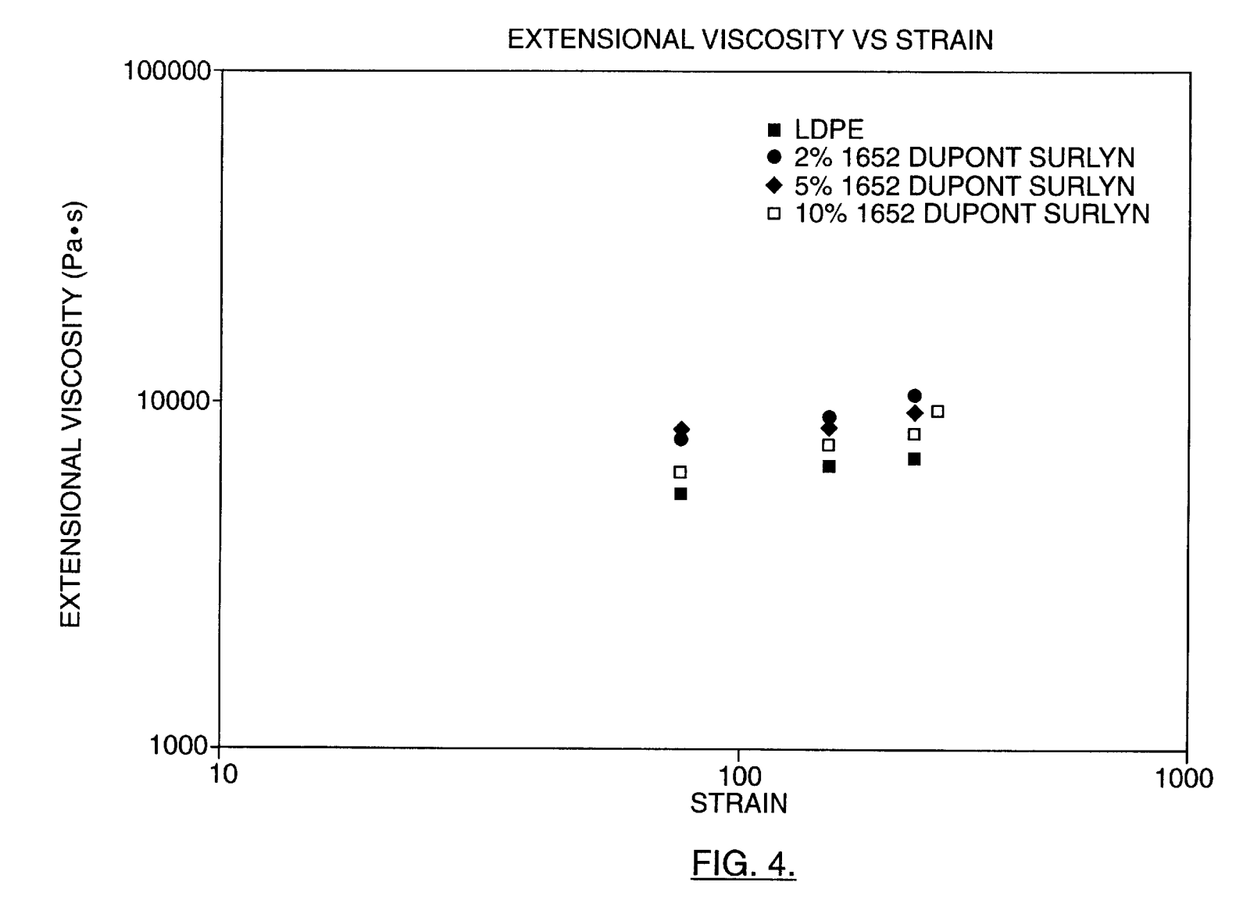
FIGS. 4 and 5 are plots of extensional viscosity against strain for examples of regular low density polyethylene sheet foam and for sheet foams prepared with ionomer in the resin.
Figure 5:
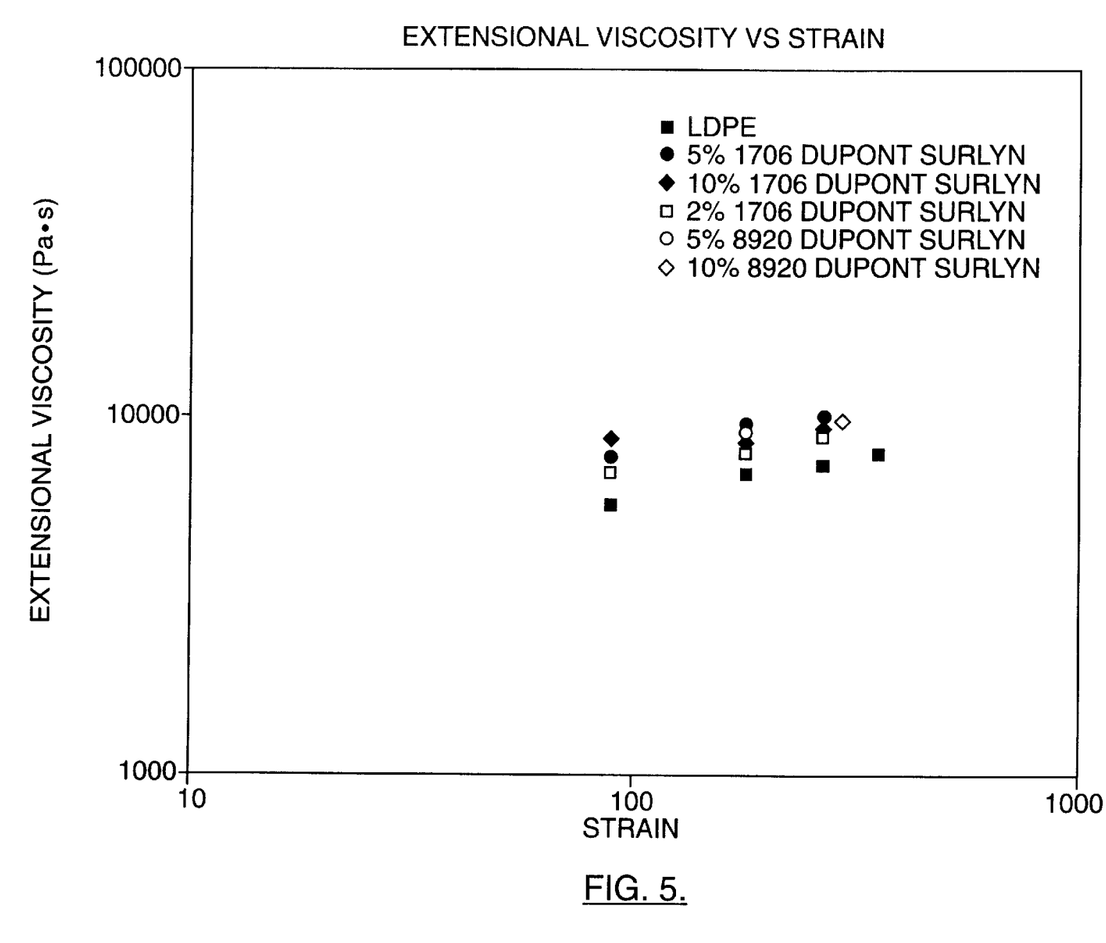

FIGS. 4 and 5 are plots of extensional viscosity against strain for samples of regular low density polyethylene sheet foams prepared with ionomer in the resin in accordance with the invention. Extensional viscosity is in the units of Pascal x seconds. Extensional viscosity is a measure of the ability of the material to resist extensional stress. Extensional viscosity is determined by stretching to extend a molten rod of resin to the breaking point, and measuring the resistance. These plots show clearly that the presence of ionomer in a low density polyethylene resin produces a foam that has superior resistance to stress as compared to a low density polyethylene foam in the absence of ionomer.

The samples for FIGS. 4 and 5 were prepared with various DuPont Surlyn ionomers. DuPont Surlyn 1652 has a meltflow index of 5.2 g/10 min with a zinc ion. DuPont Surlyn 1706 has a meltflow index of 0.7 g/10 min with a zinc ion. Surlyn 8920 resin has a meltflow index of 1.0 with a sodium ion.

Tables 8 and 9 below, show data obtained from heat shrinkage tests. This data shows that foams with ionomer have improved thermoformability properties. The ionomer foams show smaller dimensional changes with the application of heat over time, which is a reflection of thermal stability. The data in the tables was taken from a square sample of foam that measured 30.4 cm on each side. In Table 8, the foam was kept in an oven at 66.70° centigrade for 3 hours and that at 20° centigrade for 1 hour. In Table 9, the foams were kept for 3 hours in an oven at 80° centigrade and for 1 hour at 20° centigrade. Several of the samples without ionomer curled after heating in the oven for 3 hours.

TABLE 8

| Foam Gauge | Metallocene | Ionomer | Dimension Change |
| --- | --- | --- | --- |
| 6.35 mm* | 25% | 0 | MD: −2.4% CMD: +0.8% |
| 6.35 mm* | 25% | 0 | MD: −3.7% CMD: +1.3% |
| 6.35 mm | 25% | 5% | MD: +0.5% CMD: −0.8% |
| 3.17 mm | 25% | 5% | MD: −0.3% CMD: −0.8% |
| 3.17 mm | 0 | 0 | MD: −2.4% CMD: +1.3% |

TABLE 9

| Foam Gauge | Metallocene | Ionomer | Dimension Change |
| --- | --- | --- | --- |
| 3.17 mm | 0 | 0 | MD: −1.3% CMD: +0.3% |
| 3.17 mm | 25% | 0 | MD: −2.1% CMD: +0.5% |
| 3.17 mm | 25% | 5% | MD: −0.8% CMD: +0.5% |
| 1.58 mm | 25% | 5% | MD: −1.1% CMD: +0.3% |
| 6.35 mm* | 25% | 0 | MD: −4.5% CMD: +1.3% |
| 6.35 mm | 25% | 5% | MD: −2.4% CMD: +0.5% |

*Sample curled after oven heating for three hours.

Particular embodiments of the invention have been described in detail in the tables and drawings and specific terms have been used. It should be understood in a generic and a descriptive sense and not for purposes of limitation, the scope of the invention as defined by the claims.

What is claimed is:

1. A continuously extruded recyclable foam sheet having a density of from 20 to 150 kg/m³ comprising a homogeneous admixture of polyolefin and ionomer in an amount of from about 1 to 40% by weight of said admixture.

2. The foam sheet of claim 1 having a density of from about 20 to 150 kg/m³.

3. The foam sheet of claim 1 wherein said polyolefin is low density polyethylene and said admixture further comprises metallocene polyethylene present in an amount of from about 5 to 30% by weight of said admixture.

4. The foam sheet of claim 1 wherein said polyolefin is low density polyethylene present in said admixture in an amount of from about 45 to 93% by weight of said sheet.

5. The foam sheet of claim 1 wherein said sheet is thermoformed.

6. The foam sheet of claim 5 wherein said thermoformed sheet is a product selected from the group consisting of trays for medical and dental instruments.

7. The foam sheet of claim 1 wherein said sheet has thickness less than about ½ inch.

8. The foam sheet of claim 1 wherein said sheet has thickness of from about ½ inch to 3 inches.

9. The foam sheet of claim 1 wherein said sheet is recyclable.

10. A thermoformed foam sheet product comprising low density polyethylene and ionomer present in an amount of from about 2 to 25% by weight of said foam sheet.

11. A thermoformed foam sheet product comprising low density polyethylene and ionomer present in an amount of from about 5 to 10% by weight of said foam sheet.

12. A recyclable, continuously extruded foam sheet having a density of from about 20 to 150 kg/m$^3$ and comprising a homogeneous admixture of low density polyethylene that is present in said admixture in an amount of from about 45 to 93% by weight of said admixture, metallocene polyethylene that is present in said admixture in an amount of from about 5 to 30% by weight of said admixture, and ionomer that is present in said admixture in an amount of from about 2 to 25% by weight of said admixture.

13. The foam sheet of claim 12 wherein said sheet has a density of about 20 to 50 kg/m$^3$.

14. The foam sheet of claim 12 wherein ionomer is present in said admixture in an amount of about 1 to 10% by weight of said blend.

15. The foam sheet of claim 12 wherein said sheet has from about 15 to 60 cells per square inch.

16. The foam sheet of claim 12 wherein said sheet successfully resists an impact of from 200 to 425 psi.

* * * * *

UNITED STATES PATENT AND TRADEMARK OFFICE
CERTIFICATE OF CORRECTION

PATENT NO. : 6,066,393
DATED : May 23, 2000
INVENTOR(S) : Lee

It is certified that error appears in the above-identified patent and that said Letters Patent is hereby corrected as shown below:

Column 10, line 51, "20 to 150 kg/m$^3$" should read --20 to 50 kg/m$^3$--.

Signed and Sealed this

Third Day of April, 2001

*Attest:*

NICHOLAS P. GODICI

*Attesting Officer*   *Acting Director of the United States Patent and Trademark Office*